(12) United States Patent
Plüss et al.

(10) Patent No.: US 9,483,417 B2
(45) Date of Patent: Nov. 1, 2016

(54) MOBILE ELECTRONIC DEVICE WITH TRANSCEIVER FOR WIRELESS DATA EXCHANGE

(71) Applicants: Marcel Plüss, Tann (CH); Peter Plüss, Tann (CH)

(72) Inventors: Marcel Plüss, Tann (CH); Peter Plüss, Tann (CH)

(73) Assignee: LEGIC IDENTSYSTEMS AG (CH)

( * ) Notice: Subject to any disclaimer, the term of this patent is extended or adjusted under 35 U.S.C. 154(b) by 0 days.

(21) Appl. No.: 14/284,836

(22) Filed: May 22, 2014

(65) Prior Publication Data

US 2014/0359714 A1 Dec. 4, 2014

(30) Foreign Application Priority Data

May 29, 2013 (CH) ........................................ 1022/13

(51) Int. Cl.
| | |
|---|---|
| *G06F 21/62* | (2013.01) |
| *G06F 12/14* | (2006.01) |
| *G06Q 20/34* | (2012.01) |
| *H04M 1/725* | (2006.01) |
| *G06K 7/10* | (2006.01) |
| *H04L 29/06* | (2006.01) |
| *H04W 4/00* | (2009.01) |
| *H04W 12/08* | (2009.01) |

(52) U.S. Cl.
CPC ....... G06F 12/1475 (2013.01); G06K 7/10386 (2013.01); G06Q 20/351 (2013.01); H04L 63/10 (2013.01); H04M 1/7253 (2013.01); H04W 4/003 (2013.01); H04W 12/08 (2013.01); *H04M 2250/04* (2013.01); *H04W 4/008* (2013.01)

(58) Field of Classification Search
CPC ... G06F 12/1475; H04L 63/10; H04W 4/003
See application file for complete search history.

(56) References Cited

U.S. PATENT DOCUMENTS

| | | | |
|---|---|---|---|
| 8,196,131 B1 * | 6/2012 | von Behren et al. | 717/168 |
| 2003/0145205 A1 | 7/2003 | Sarcanin | 713/172 |
| 2012/0011572 A1 | 1/2012 | Chew et al. | 726/4 |
| 2013/0183936 A1 * | 7/2013 | Smtih | H04W 12/06 455/411 |

FOREIGN PATENT DOCUMENTS

| | | |
|---|---|---|
| GB | 2 434 661 | 8/2007 |
| WO | WO 0193212 A2 * | 12/2001 |

\* cited by examiner

*Primary Examiner* — Izunna Okeke
(74) *Attorney, Agent, or Firm* — Ostrolenk Faber LLP

(57) ABSTRACT

A mobile electronic device (1) comprises a data store (11), a transceiver (13) for wireless data exchange with another electronic device (2), and a processor (12) connected to the transceiver (13) and the data store (11). The processor (12) is programmed to implement a virtual card reader (121) which is configured to communicate with a smart card module (122, 20) that is arranged in the mobile electronic device (1). The virtual card reader (121) is implemented as a program running on processor (12). At least one smart card module (122) is a virtual card implemented as a program running on the processor (12). The virtual card reader (121) makes it possible to access smart card modules which are implemented locally in the mobile electronic device as a virtual card, thereby enabling access to a smart card module, without requiring an external reader device.

15 Claims, 4 Drawing Sheets

MOBILE ELECTRONIC DEVICE WITH TRANSCEIVER FOR WIRELESS DATA EXCHANGE

CROSS REFERENCE TO RELATED APPLICATIONS

The present application claims benefit of Swiss application no. 01022/13 filed May 29, 2013, the disclosure of which is incorporated herein by reference.

FIELD OF THE INVENTION

The present invention relates to a mobile electronic device comprising a data store, a transceiver for wireless data exchange with another electronic device, and a processor connected to the transceiver and the data store.

BACKGROUND OF THE INVENTION

Mobile electronic device devices are increasingly equipped with transceivers for wireless data exchange with other electronic devices. Particularly, for close range communication, where the communicating devices are located at a distance from each other of only a few centimetres, e.g. 0 cm to 15 cm, mobile electronic devices, such as mobile radio telephones, tablet computers, personal data assistant devices (PDA), or portable personal computers, are equipped with RF (Radio Frequency) communication modules, such as active RFID transceivers (Radio Frequency Identifier), passive RFID transceivers, active NFC transceivers (Near Field Communication) or passive NFC transceivers. As there is an established infrastructure of reader devices, for interacting with RFID transceivers implemented on chip cards, so called smartcards or Integrated Circuit Cards (ICC), as well as access rights management systems and protocols for RFID chip card applications such as cashless payment, accounting of printing & copying costs, access control, stand-alone locks, hotel and campus solutions, etc., related functions of smart card modules are increasingly implemented into mobile electronic devices other than chip card devices, e.g. into mobile radio telephones, tablet computers, PDAs or portable personal computers. Thus, instead of carrying and using one or more smartcards, users may more conveniently use their other mobile electronic devices, e.g. a mobile radio telephone, to interact with a card reader for traditional RFID chip card applications. However, because of the stringent security and access restrictions with regards to data and/or functional content of smartcard modules, applications of smart card modules are limited to interactions with dedicated (special purpose) external reader devices, separate from the mobile electronic devices where the smartcard modules are implemented, even though these mobile electronic devices comprise processors, data memory, and displays.

SUMMARY OF THE INVENTION

It is an object of this invention to provide a mobile electronic device with a data store, a transceiver for wireless data exchange, and a processor connected to the transceiver and the data store, which mobile electronic device does not have at least some of the disadvantages of the prior art.

According to the present invention, these objects are achieved through the features of the independent claims. In addition, further advantageous embodiments follow from the dependent claims and the description.

A mobile electronic device comprises a data store, a transceiver for wireless data exchange with another electronic device, and a processor connected to the transceiver and the data store.

According to the present invention, the above-mentioned objects are particularly achieved in that the processor is programmed to implement at least a virtual card reader configured to communicate with a smart card module which is arranged in the mobile electronic device. Thus, the virtual card reader makes it possible to access smart card modules which are implemented locally in the mobile electronic device.

Therefore, there is no longer a restriction for smart card modules to interact solely with dedicated (special purpose) external reader devices, separate from the mobile electronic device where the smartcard modules are implemented. Quite to the contrary, the virtual card reader enables direct interaction between smart card modules and the virtual card reader within one and the same device.

In an embodiment, the processor is further configured to implement a virtual machine platform, and the virtual card reader is implemented as a program running on the virtual machine platform.

In a further embodiment, the smart card module is a virtual card implemented as a program running on the processor, and the virtual card reader is configured to communicate with the virtual card via a programmed communication interface. For example, the smart card module is a virtual card implemented as a program running on the virtual machine platform, and the virtual card reader is configured to communicate with the smart card module via the virtual machine platform. Thus, the virtual card reader is configured to interact via a programmed communication interface with virtual cards arranged internally in the mobile electronic device.

In an embodiment, the virtual card reader is further configured to communicate via the transceiver with a smart card module arranged externally to the mobile electronic device in another electronic device.

In an embodiment, the virtual card reader is configured to execute authentication and access control protocols, which govern authentication and access control between the virtual card reader and the smart card module, for accessing the smart card module to read data from the smart card module, write data into the smart card module, and/or interact with an application of the smart card module. Thus, even for accessing the virtual card, the virtual card reader executes authentication and access control protocols, and requires cryptographic keys and/or access rights for accessing the virtual card.

In a further embodiment, the virtual card reader is configured to receive via the transceiver from a computerized access rights authority one or more cryptographic keys and/or access rights for accessing the smart card module to read data from the smart card module, write data into the smart card module, and/or interact with an application of the smart card module. Thus, even for accessing the virtual card, the virtual card reader receives cryptographic keys and/or access rights to read data from the virtual card, write data into the virtual card, and/or interact with an application of the virtual card.

In an embodiment, the mobile electronic device further comprises a display, and the virtual card reader is configured to output data on the display, particularly, data read from the smart card module. Thus, without requiring an external reader device, a user can access and view data of a smartcard module which is implemented as virtual card on the same mobile electronic device, e.g. current amount of prepaid accounts or other numerical values, such as tickets for public transportation, cinemas, sport events, etc.

In further embodiments, the mobile electronic device is implemented as a mobile radio telephone, a chip card, a tablet computer, or a portable personal computer, and the transceiver comprises an active RFID transceiver, a passive RFID transceiver, an active NFC transceiver, and/or a passive NFC transceiver.

In addition to the mobile electronic device, the present invention also relates to a computer program product comprising a non-transient computer-readable medium having stored therein computer program code configured to control a processor of a mobile electronic device, which mobile electronic device comprises a transceiver for wireless data exchange with another electronic device and a data store connected to the processor, such that the processor implements at least a virtual card reader configured to communicate with a smart card module which is arranged in the mobile electronic device.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
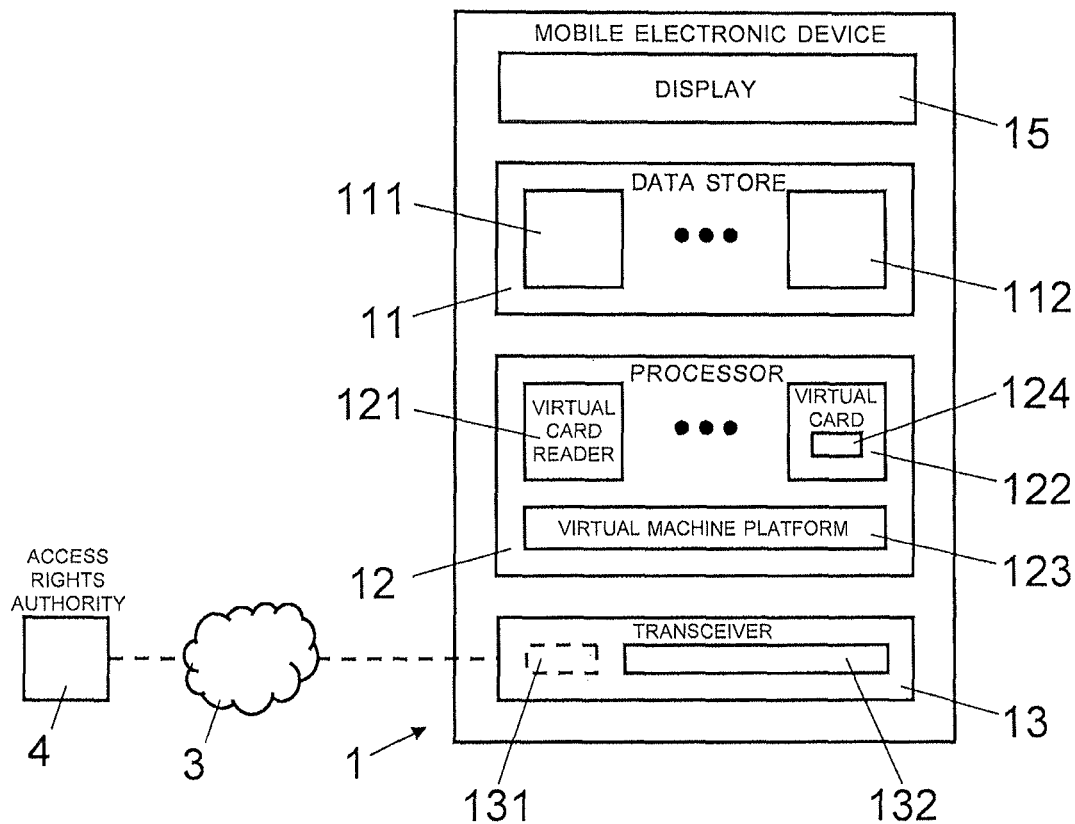
FIG. 1: shows a block diagram illustrating schematically a mobile electronic device comprising a processor which is programmed to implement a virtual card reader for communicating with a smart card module.

In FIGS. 1-4, reference numeral 1 refers to a mobile electronic device which comprises a data store 11, a transceiver 13 for wireless data exchange with another electronic device 2, separate from the mobile electronic device 1, and a processor 12 which is connected to the transceiver 13 and the data store 11. In an embodiment, the mobile electronic device 1 further comprises a display 15 connected to and controlled by the processor 12. Depending on the application and scenario, the mobile electronic device 1 is implemented as mobile radio telephone, a chip card, or a mobile computer such as a tablet computer, a PDA, or a portable personal computer.

For close range communication, the transceiver 13 comprises an RF communication module 132 (Radio Frequency), e.g. an active RFID transceiver (Radio Frequency Identifier), a passive RFID transceiver, an active NFC transceiver (Near Field Communication) or a passive NFC transceiver. For example, the RF communication module 132 is configured to interact with a contactless device according to a standardized RFID protocol as defined in standards such as ISO 18092, ISO 15693, or ISO 14443, or according to a proprietary data transmission or RFID protocol. For example, the RF communication module 132 is configured to operate at a carrier frequency in the range of 100 KHz to 2.5 GHz; particularly, the carrier frequency is set to the working frequency of an RFID system, e.g. 6.78 MHz, 13.56 MHz, or 27.12 MHz (or another multiple of 13.56 MHz).

Depending on the implementation of the mobile electronic device 1, for remote communication via a telecommunications network 3, the transceiver 13 further comprises an optional mobile radio communication module 131, e.g. a WLAN module (Wireless Local Area Network), or a GSM (Global System for Mobile Communications) or UMTS (Universal Mobile Telecommunications System) module for GPRS (General Packet Radio Service), HSPA (High-Speed Packet Access), EDGE (Enhanced Data Rates for GSM Evolution), and/or LTE (Long Term Evolution) or another mobile radio data communication service.

In FIGS. 1-4, reference numeral 121 refers to a virtual card reader. The virtual card reader 121 is implemented as a programmed software module comprising computer program code to control the processor 12. The computer program code is stored on a non-transient computer-readable medium which is part of or connected to the processor 12. Specifically, the computer program code is configured to control the processor 12 directly, by way of processor-specific instructions, or via an (intermediate) hardware abstraction layer, such as a virtual machine platform 123, e.g. by way of interpretable instructions. The virtual machine platform 123, e.g. a Java Virtual Machine (JVM) or a Java Card Open Platform (JCOP) as specified by the GlobalPlatform association, is again implemented as a programmed software module comprising computer program code to control the processor 12. In an alternative embodiment, the virtual card reader 121 is implemented by way of VHDL (Very High Speed Integrated Circuit Hardware Description Language) or VHSIC Hardware Description Language running on a VHDL Simulator which is implemented on processor 12.

The virtual card reader 121 is configured to emulate the functions of a hardware-implemented card reader, e.g. a card reader for interacting with a device according to a standardized RFID protocol as defined in standards such as ISO 18092, ISO 21481, ISO 15693, or ISO 14443, or according to a proprietary data transmission or RFID protocol.

In FIGS. 1-4, reference numeral 111 refers to reader data which is stored in the data store 11 and is accessible only for the virtual card reader 121.

Figure 3:
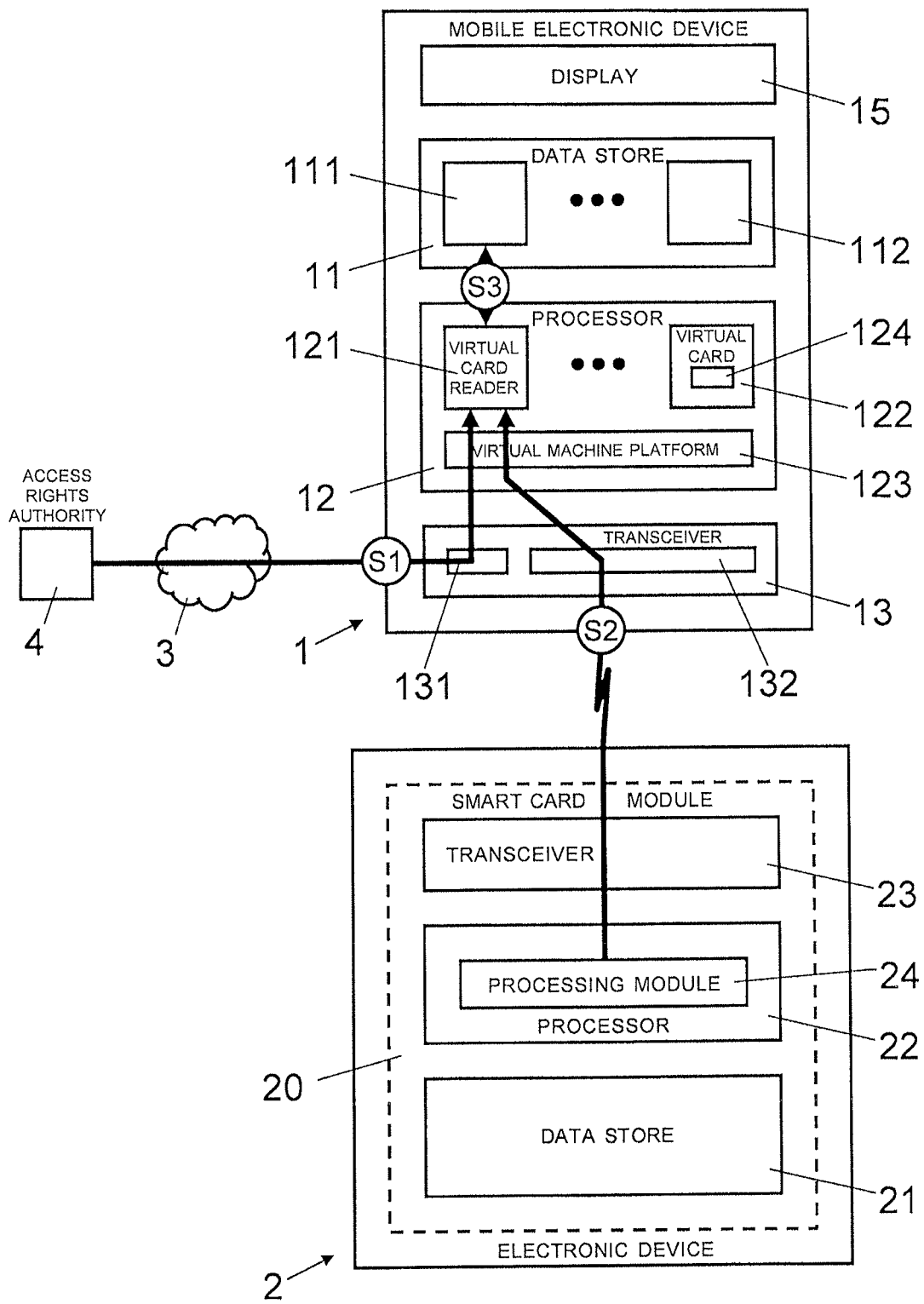
FIG. 3: shows a block diagram illustrating schematically a smart card module and a mobile electronic device comprising a processor which is programmed to implement a virtual card reader for receiving from an access rights authority cryptographic keys and/or access rights for accessing the smart card module.
Figure 4:
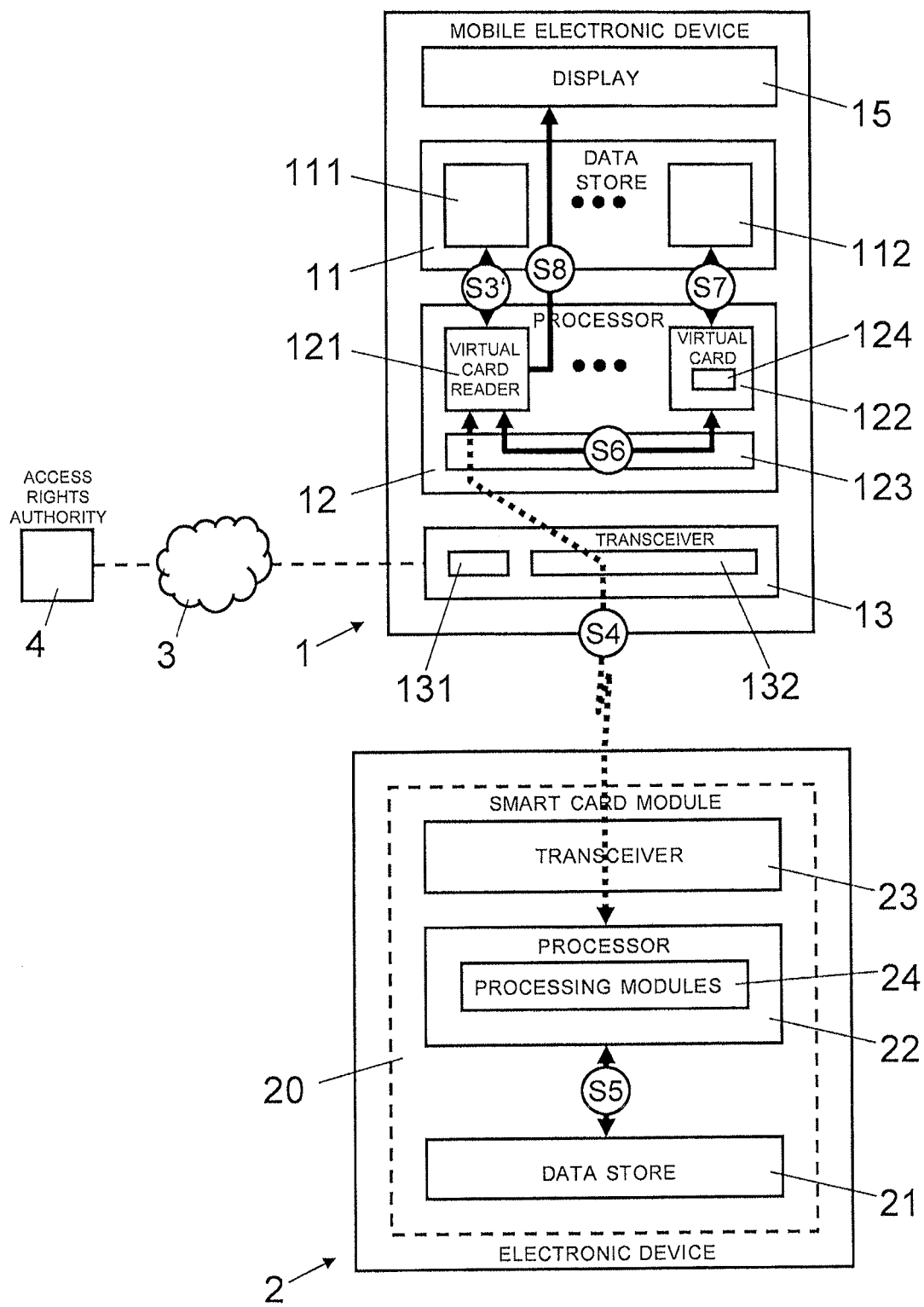
FIG. 4: shows a block diagram illustrating schematically a mobile electronic device comprising a display and a processor which is programmed to implement a virtual card reader for reading data from a smart card module and showing the data on the display.

As illustrated schematically in FIGS. 1, 3 and 4, in an embodiment or configuration, the mobile electronic device 1 further comprises one or more smart card modules 122 which are each implemented as a virtual card 122 (for convenience the smart card module of the mobile electronic device 1 and its implementation as a virtual card are both denoted with reference numeral 122). As described above in the context of the virtual card reader 121, the virtual card 122 is implemented as a programmed software module comprising computer program code which is stored on a non-transient computer-readable medium and configured to control the processor 12 directly, by way of processor-specific instructions, or via the hardware abstraction layer, e.g. by way of interpretable instructions. In an alternative embodiment, the virtual card 122 is implemented by way of VHDL (Very High Speed Integrated Circuit Hardware Description Language) or VHSIC Hardware Description Language running on a VHDL Simulator which is implemented on processor 12.

The virtual card 122 is configured to emulate the functions of a hardware-implemented smart card, i.e. a chip card or integrated circuit card comprising a processor and memory (RAM, ROM), for example an RFID card for interacting with a card reader according to a standardized RFID protocol as defined in standards such as ISO 18092, ISO 21481, ISO 15693, or ISO 14443, or according to a proprietary data transmission or RFID protocol.

In FIGS. 1, 3, and 4, reference numeral 112 refers to card data which is stored in the data store 11 and is accessible only to the virtual card 122.

In FIGS. 1, 3, and 4, reference numeral 124 refers to a card application of the virtual card 122. The card application 124 is implemented as a programmed software module comprising computer program code which is stored on a non-transient computer-readable medium and configured to control the processor 12 directly, by way of processor-specific instructions, or via the hardware abstraction layer, e.g. by way of interpretable instructions. The virtual card 122 is configured to control access and execution of the card application 124 in adherence to respective standards and specifications for non-virtual (real) smart card modules, e.g. in accordance with specifications defined by the GlobalPlatform association for managing applications, the MULTOS (Multi Operating System) security standard for smart cards defined by the MULTOS Consortium, TCOS (TeleSec Chipcard Operating System) defined by T-Systems International GmbH of Deutsche Telekom AG, the EMV standard defined by Europay International (now MasterCard Europe), MasterCard and VISA, or MTSC (Master-Token System Control) defined by LEGIC Identsystems AG.

Figure 2:
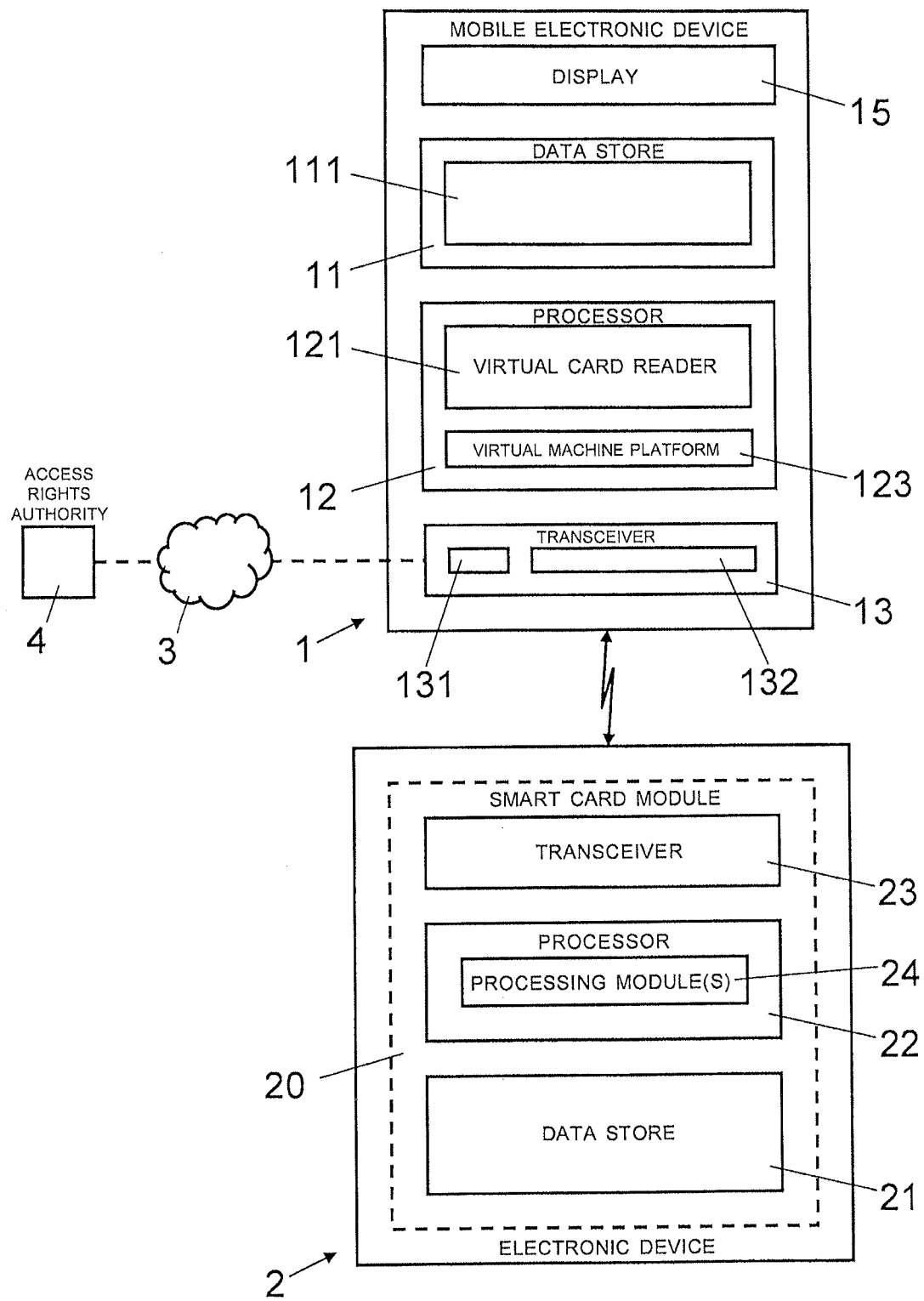
FIG. 2: shows a block diagram illustrating schematically a smart card module and a mobile electronic device comprising a processor which is programmed to implement a virtual card reader for communicating with the smart card module.

In FIGS. 2-4, the reference numeral 2 refers to an electronic device, e.g. a mobile radio telephone, a chip card, or a mobile computer such as a tablet computer or a portable personal computer. As illustrated in FIGS. 2-4, a smart card module 20 is implemented on the electronic device 2. The smart card module 20 comprises a data store 21, a transceiver 23 with an RF communication module for wireless, close range communication, as described above in the context of transceiver 13, and a processor 22 connected to the transceiver 23 and the data store 21. As is illustrated schematically in FIGS. 2-4, the smart card module 20 further comprises one or more processing modules 24 which are implemented as programmed software modules running on processor 22. Specifically, the processing modules 24 comprise computer program code to control the processor 22 to perform various functions, for example the function of an access rights authority, an access control module, a data reading module and/or a data writing module, as described later in more detail.

In FIGS. 1-4, reference numeral 4 refers to a computerized access rights authority which comprises one or more computers configured to communicate with the mobile electronic device 1 via telecommunications network 3. The computerized access rights authority 4 is configured to store and manage cryptographic keys and/or access rights for accessing smart card modules 20, including smart card modules implemented as virtual cards 122. The cryptographic keys and/or access define for an identified smart card module 20, 122 the rights to read data from the smart card module 20, 122, write data into the smart card module 20, 122, and interact with an application of the smart card module 20, 122.

Depending on embodiment and/or configuration, the virtual card reader 121 is configured to interact and communicate with smart card modules 20 which are implemented on the electronic device 2 separate from and external to the mobile electronic device 1, as depicted in FIGS. 2-4, and/or with smart card modules 122 which are implemented as virtual cards 122, as depicted in FIGS. 1, 3 and 4.

In the scenarios depicted in FIGS. 2-4, the virtual card reader 121 is configured to interact and communicate wirelessly with the smart card module 20 implemented on the electronic device 2 via the RF communication module 132.

In the scenarios depicted in FIGS. 1, 3 and 4, the virtual card reader 121 is configured to interact and communicate with the virtual card 122 implemented on the mobile electronic device 1, via a software-implemented communication interface which includes computer program code to control processor 12. In an embodiment, the virtual card reader 121 is configured to interact and communicate with the virtual card 122 via the virtual machine platform 123, specifically, via a communication interface implemented on the virtual machine platform 123.

In the following paragraphs, exemplary sequences of steps performed by the virtual card reader 121 and/or the virtual card 122 of the mobile electronic device 1 are described with reference to FIGS. 3 and 4.

As illustrated in FIG. 3, in step S1, the virtual card reader 121 uses the mobile radio communication module 131 of the transceiver 13 to receive from the computerized access rights authority 4 via the telecommunications network 3 cryptographic keys and/or access rights for accessing the smart card module 20 and/or the virtual card 122. For example, the cryptographic keys and/or access rights are transmitted by the computerized access rights authority 4 in push-mode to the mobile electronic device 1. Alternatively, the cryptographic keys and/or access rights are transmitted by the computerized access rights authority 4 in pull-mode, in response to a request from the mobile electronic device 1.

In step S2, the virtual card reader 121 uses the RF communication module 132 of the transceiver 13 to receive wirelessly from the access rights authority, implemented as part of the processing module 24 on the processor 22 of the electronic device 2 or the smart card module 20, respectively, cryptographic keys and/or access rights for accessing the smart card module 20 and/or the virtual card 122. For example, the cryptographic keys and/or access rights are transmitted by the processing module 24 in push-mode to the mobile electronic device 1. Alternatively, the cryptographic keys and/or access rights are transmitted by the processing module 24 in pull-mode, in response to a request from the mobile electronic device 1.

One skilled in the art will understand that various cryptographic algorithms can be used to securely transfer the cryptographic keys and/or access rights from the computerized access rights authority 4 or the processing module 24, respectively, to the mobile electronic device 1, specifically, to the virtual card reader 121.

In step S3, the virtual card reader 121 stores the cryptographic keys and/or access rights received in step S1 or S2. The virtual card reader 121 stores the cryptographic keys and/or access rights as card reader data 111 assigned to the smart card module 20 and/or the virtual card 122, respectively. For example, the smart card module 20 and/or the virtual card 122 are defined by way of a unique card identifier.

As illustrated in FIG. 4, for accessing the smart card module 20 and/or the virtual card 122, in step S3', the virtual card reader 121 reads and retrieves the respective cryptographic keys and/or access rights from the card reader data 111 in the data store 11.

In optional step S4, the virtual card reader 121 uses the cryptographic keys and/or access rights obtained in step S3' to access the smart card module 20. Communication and interaction between the virtual card reader 121 and the smart card module 20 is executed via the RF communication module 132 of the transceiver 13 and the RF communication module of the transceiver 23 of the smart card module 20. The virtual card reader 121 uses the cryptographic keys and/or access rights to execute authentication and access control protocols between the virtual card reader 121 and the smart card module 20 or its access control module, implemented as a processing module on processor 22, respectively.

If the smart card module 20 or its access control module, respectively, verifies and confirms the authority and access rights of the virtual card reader 121, in step S5, the smart card module 20 or its data reading module or data writing module, implemented as processing modules on processor 22, respectively, reads requested data from or writes supplied data into the data store 21 of the smart card module 20. For access requests related to a specific application of the smart card module 20, interaction with the application is enabled, initiated and executed.

In step S6, the virtual card reader 121 uses the cryptographic keys and/or access rights obtained in step S3' to access the virtual card 122. Communication and interaction between the virtual card reader 121 and the virtual card 122 is executed via a software-implemented communication interface as described above in the context of the scenarios depicted in FIGS. 1, 3 and 4. The virtual card reader 121 uses the cryptographic keys and/or access rights to execute authentication and access control protocols between the virtual card reader 121 and the virtual card 122.

If the virtual card 122 verifies and confirms the authority and access rights of the virtual card reader 121, in step S7, the virtual card 122 reads the requested data from or writes the supplied data into the card data 112 stored in the data store 11. For access requests related to a specific application 124 of the virtual card 122, the virtual card 122 enables, initiates and executes interaction with the application 124.

Thus, as illustrated in step S6 of FIG. 4, the virtual card reader 121 communicates with a smart card module 122 which is arranged locally in the mobile electronic device 1 as a virtual card.

One skilled in the art will understand that various standardized or proprietary cryptographic algorithms may be used to perform the authentication and access control protocols between the virtual card reader 121 and the virtual card 122 or the smart card module 20, respectively. The virtual card reader 121 and the virtual card 122 or the smart card module 20, respectively, are configured to perform the authentication and access control protocols in adherence to respective standards and specifications for non-virtual (real) smart card modules, e.g. in accordance with ISO 7816 and/or ISO 9798, as described by the GlobalPlatform association.

In step S8, the virtual card reader 121 shows on the display 15 data read from the virtual card 122, i.e. card data 112 stored in the data store 11, data read from the smart card module 20, i.e. data from data store 21, or application specific data received from application 124 of the virtual card or an application running on the processor 22 of the smart card module 20.

Table 1 below illustrates, various implementations of the mobile electronic device 1 and related communication scenarios A, B, C, D, E, F between the virtual card reader 121 of the mobile electronic device 1 and possible communication partners, specifically, between the virtual card reader 121 and the virtual card 122 of the mobile electronic device 1 or the smart card module 20 associated with the other electronic device 2. For example, in scenarios A, B and C, the mobile electronic device 1 is implemented as a mobile radio telephone or a mobile computer and the communication partner of the virtual card reader 121 is the mobile electronic device 1 itself (scenario A) or another electronic device 2 (scenarios B and C). While in scenario B the other electronic device 2 is implemented as a chip card and, thus, has the role of a conventional chip card, in scenario C, the other electronic device 2 is implemented as a mobile radio telephone or a mobile computer and has the role of a virtual card. In scenarios D, E, and F, the mobile electronic device 1 is implemented as a chip card and the communication partner of the virtual card reader 121 is the mobile electronic device 1 itself (i.e. the chip card) or another electronic device 2. While in scenario E the other electronic device 2 is implemented as a chip card and, thus, has the role of a conventional chip card, in scenario F, the other electronic device 2 is implemented as a mobile radio telephone or a mobile computer and has the role of a virtual card. In scenarios D and E, the presence of a powered external electronic device is required for powering the chip card(s), whereas in scenario F, the chip card incorporating the mobile electronic device 1 is powered by the other electronic device 2.

TABLE 1

| | Implementation of mobile electronic device 1 | Role of mobile electronic device 1 | Communication partner | Role of partner |
|---|---|---|---|---|
| A | Mobile radio telephone, mobile computer | Virtual card reader and virtual card | Mobile electronic device 1 | Virtual card |
| B | Mobile radio telephone, mobile computer | Virtual card reader | Other electronic device 2 Implemented as chip card | Chip card |
| C | Mobile radio telephone, mobile computer | Virtual card reader | Other electronic device 2 Implemented as mobile radio telephone or mobile computer | Virtual card |
| D | Chip card | Virtual card reader and virtual card | Mobile electronic device 1 (external electronic device required for powering the chip card) | Virtual card |

TABLE 1-continued

| | Implementation of mobile electronic device 1 | Role of mobile electronic device 1 | Communication partner | Role of partner |
|---|---|---|---|---|
| E | Chip card | Virtual card reader | Other electronic device 2 Implemented as chip card (external electronic device required for powering the chip cards) | Chip card |
| F | Chip card | Virtual card reader | Other electronic device 2 Implemented as mobile radio telephone or mobile computer (used for powering the chip card) | Virtual card |

As indicated in bold in Table 1, in scenarios A and D, the virtual card reader 121 is configured to communicate with a smart card module 122, i.e. a virtual card, which is arranged locally in the mobile electronic device 1.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A mobile electronic device comprising a data store, a transceiver for wireless data exchange with another electronic device, and a processor connected to the transceiver and the data store,
    wherein the processor is programmed to implement at least a virtual card reader configured to communicate with a smart card module which is arranged in the mobile electronic device, and
    wherein the processor is further configured to implement a virtual machine platform, and the virtual card reader is implemented as a program running on the virtual machine platform,
    wherein the smart card module is a virtual card implemented as a program running on the virtual machine platform, and the virtual card reader is configured to communicate with the smart card module via the virtual machine platform, and
    wherein the virtual card reader is a software-based emulator of an RFID reader that enables virtual transceiver to transceiver communication with the smart card module, and
    wherein the virtual card reader is configured to execute authentication and access control protocols, which govern authentication and access control between the virtual card reader and the smart card module, and to receive via the transceiver from a computerized access rights authority one or more cryptographic keys and/or access rights, for accessing the smart card module to perform at least one of: reading data from the smart card module, writing data into the smart card module, and interacting with an application of the smart card module.

2. The mobile electronic device of claim 1, wherein the virtual card reader is configured to communicate via the transceiver with a smart card module arranged in the other electronic device.

3. The mobile electronic device of claim 1, wherein the virtual card reader is configured to execute authentication and access control protocols, which govern authentication and access control between the virtual card reader and the smart card module, for accessing the smart card module to perform at least one of: reading data from the smart card module, writing data into the smart card module, and interacting with an application of the smart card module.

4. The mobile electronic device of claim 1, wherein the virtual card reader is configured to receive via the transceiver from a computerized access rights authority one or more cryptographic keys and/or access rights for accessing the smart card module to perform at least one of: reading data from the smart card module, writing data into the smart card module, and interacting with an application of the smart card module.

5. The mobile electronic device of claim 1, wherein the mobile electronic device further comprises a display; and the virtual card reader is configured to output data on the display, particularly, data read from the smart card module.

6. The mobile electronic device of claim 1, wherein the mobile electronic device is implemented as one of: a mobile radio telephone, a chip card, a tablet computer, and a portable personal computer; and the transceiver comprises one of: an active RFID (radio-frequency identification) transceiver, a passive RFID transceiver, an active NFC (near field communication) transceiver, and a passive NFC transceiver.

7. A computer program product comprising a non-transient computer-readable medium having stored therein computer program code configured to control a processor of a mobile electronic device, which mobile electronic device comprises a transceiver for wireless data exchange with another electronic device and a data store connected to the processor, such that the processor implements at least a virtual card reader configured to communicate with a virtual smart card module which is arranged in the mobile electronic device,
    wherein the virtual card reader is a software based emulator of an RFID reader that enables virtual transceiver to transceiver communication with the virtual smart card module,
    wherein the virtual card reader is configured with the code to execute authentication and access control protocols, which govern authentication and access control between the virtual card reader and the smart card module, and to receive via the transceiver from a computerized access rights authority one or more cryptographic keys and/or access rights, for accessing the smart card module to perform at least one of: reading data from the smart card module, writing data into the smart card module, and interacting with an application of the smart card module.

8. The computer program product of claim 7, wherein the program code is further configured to control the processor of the mobile electronic device, such that the processor implements a virtual machine platform, and such that the processor implements the virtual card reader as a program running on the virtual machine platform.

9. The computer program product of claim 8, wherein the program code is further configured to control the processor of the mobile electronic device, such that the processor implements the smart card module as a program running on the virtual machine platform and configured to communicate with the smart card module via the virtual machine platform.

10. The computer program product of claim 7, wherein the program code is further configured to control the processor of the mobile electronic device, such that the processor implements the virtual card reader configured to communicate via the transceiver with a smart card module arranged in the other electronic device.

11. The computer program product of claim 7, wherein the program code is further configured to control the processor of the mobile electronic device, such that the processor implements the virtual card reader configured to execute authentication and access control protocols, which govern authentication and access control between the virtual card reader and the smart card module, for accessing the smart card module to perform at least one of:
reading data from the smart card module, writing data into the smart card module, and interacting with an application of the smart card module.

12. The computer program product of claim 7, wherein the program code is further configured to control the processor of the mobile electronic device, such that the processor implements the virtual card reader configured to receive via the transceiver from a computerized access rights authority one or more cryptographic keys and/or access rights for accessing the smart card module to perform at least one of: reading data from the smart card module, writing data into the smart card module, and interacting with an application of the smart card module.

13. The computer program product of claim 7, wherein the program code is further configured to control the processor of the mobile electronic device, such that the processor implements the virtual card reader configured to output data on a display of the mobile electronic device, particularly, data read from the smart card module.

14. A mobile electronic device comprising a data store, a transceiver for wireless data exchange with another electronic device, and a processor connected to the transceiver and the data store,
wherein the processor is programmed to implement at least a virtual card reader configured to communicate with a smart card module which is arranged in the mobile electronic device, and
wherein the processor is further configured to implement a virtual machine platform, and the virtual card reader is implemented as a program running on the virtual machine platform,
wherein the smart card module is a virtual card implemented as a program running on the virtual machine platform, and the virtual card reader is configured to communicate with the smart card module via the virtual machine platform, and
wherein the virtual card reader is a software-based emulator of an RFID reader that enables virtual transceiver to transceiver communication with the smart card module, and
wherein the virtual card reader is configured to execute authentication and access control protocols, which govern authentication and access control between the virtual card reader and the smart card module, and to receive via the transceiver from a computerized access rights authority one or more cryptographic keys and/or access rights, for accessing the smart card module to perform at least one of: reading data from the smart card module, writing data into the smart card module, and interacting with an application of the smart card module.

15. A computer program product comprising a non-transient computer-readable medium having stored therein computer program code configured to control a processor of a mobile electronic device, which mobile electronic device comprises a transceiver for wireless data exchange with another electronic device and a data store connected to the processor, such that the processor implements at least a virtual card reader configured to communicate with a virtual smart card module which is arranged in the mobile electronic device,
wherein the virtual card reader is a software based emulator of an RFID reader that enables virtual transceiver to transceiver communication with the virtual smart card module wherein the virtual card reader is configured with the code to execute authentication and access control protocols, which govern authentication and access control between the virtual card reader and the smart card module, and to receive via the transceiver from a computerized access rights authority one or more cryptographic keys and/or access rights, for accessing the smart card module to perform at least one of: reading data from the smart card module, writing data into the smart card module, and interacting with an application of the smart card module.

* * * * *